United States Patent
Murase et al.

(10) Patent No.: US 7,116,804 B2
(45) Date of Patent: Oct. 3, 2006

(54) COMPUTER READADLE MEDIUM RECORDING HANDWRITTEN SIGNATURE AUTHENTICATION PROGRAM, AND HANDWRITTEN SIGNATURE AUTHENTICATION METHOD AND APPARATUS

(75) Inventors: Tadashi Murase, Nagoya (JP); Takashi Maeda, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 10/282,141

(22) Filed: Oct. 29, 2002

(65) Prior Publication Data
US 2003/0179913 A1  Sep. 25, 2003

(30) Foreign Application Priority Data
Mar. 19, 2002  (JP) .............................. 2002-075332

(51) Int. Cl.
*G06K 9/00* (2006.01)
(52) U.S. Cl. ....................................... 382/119; 382/187
(58) Field of Classification Search ......... 382/119–123
See application file for complete search history.

(56) References Cited

U.S. PATENT DOCUMENTS

| 5,202,930 | A | * | 4/1993 | Livshitz et al. | ............. 382/122 |
| 6,160,914 | A | * | 12/2000 | Muroya | ...................... 382/187 |
| 6,393,138 | B1 | * | 5/2002 | Chai | .......................... 382/119 |

* cited by examiner

*Primary Examiner*—Joseph Mancuso
*Assistant Examiner*—Damon M Conover
(74) *Attorney, Agent, or Firm*—Staas & Halsey LLP

(57) ABSTRACT

A user's handwritten signature data is transmitted to a host device, when the user registers his or her signature. A signature information controlling unit reads the codes of a character string of a font closest to handwriting shape data by referencing a signature dictionary information unit, extracts a predetermined number of digits of numeric values from the codes, generates a user ID by making the numeric values successive to the number of codes, and registers this user ID and the input handwritten signature to the signature dictionary information unit by making a correspondence between them. When a signature is authenticated, a user ID is automatically generated from a handwritten signature input by a user, and checked between generated user ID and registered user ID.

6 Claims, 6 Drawing Sheets

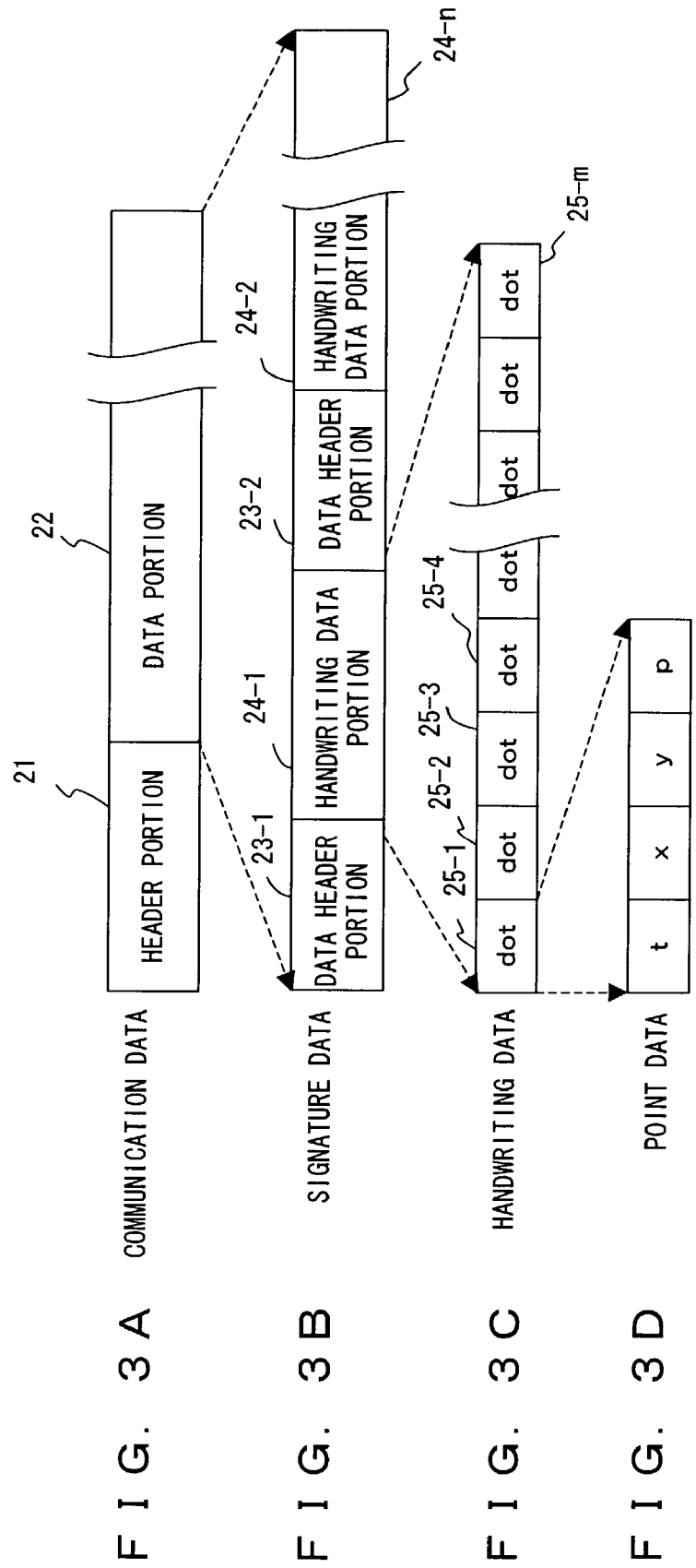

COMPUTER READADLE MEDIUM RECORDING HANDWRITTEN SIGNATURE AUTHENTICATION PROGRAM, AND HANDWRITTEN SIGNATURE AUTHENTICATION METHOD AND APPARATUS

BACKGROUND OF THE INVENTION

1. Field of the Invention

The present invention relates to a handwritten signature authentication program, method and apparatus performing registration and authentication by automatically generating a user ID based on the number of characters and contents of the characters of signature information that is handwritten and input.

2. Description of the Related Art

Conventionally, a method performing authentication according to the characteristic amounts of the handwriting of a signature is known as one type of biometrics authentication (a method authenticating a user by using a physical characteristic of a human being, such as a fingerprint, retina, iris, voice print, etc., when the user accesses a network or starts up a personal computer). In this case, checks are made by making comparisons among characteristic amounts such as a handwriting shape, a handwriting velocity, a handwriting acceleration, a handwriting pressure, etc. of the handwriting of a signature when registration is made, and those of the handwriting of a signature when attempts are made to obtain authentication.

Additionally, in this case, it is general that also a user ID is input before or after the handwritten signature is input, and the user ID information and the handwriting information of the corresponding handwritten signature are notified to an authentication system, whereby authentication is performed by making a check between a pre registered user ID and the handwriting information.

FIG. 1 explains such a conventional authentication system using inputs of a user ID and a handwritten signature. In the authentication system 1 shown in this figure, a user ID 4 "abcde00001" is first input by being handwritten with a dedicated pen not shown or selected with keys, and a kanji character signature 5 "富士通太郎" ("Fujitsu Taro") or an English signature 5' "Fujitsu" is input next to a handwritten input device 3 connected to a data input/display device 2.

Information, which are obtained from the inputs of the user ID 4 "abcde00001", and the kanji character signature 5 "富士通太郎" ("Fujitsu Taro") or the English signature 5' "Fujitsu", are registered to the storage device of a host device 6 such as a mainframe computer, etc. Note that the signature information obtained from the kanji signature 5 or the English signature 5' are handwriting components such as a handwriting shape, a handwriting velocity, a handwriting acceleration, a handwriting pressure, etc. of the signature.

Next, when the person whose name is "富士通太郎" (in kanji character) or "Fujitsu" (in English character) attempts to obtain authentication with a signature, he again handwrites and inputs the user ID 4 "abcde00001", and the kanji character signature 5 "富士通太郎" ("Fujitsu Taro") or the English signature 5' "Fujitsu" to the handwritten input device 3 of the data input/display device 2 in a similar manner as in the above described registration.

The information of the handwriting components of the kanji character signature 5 or the English signature 5' are notified to the host device 6. The host device 6 reads the registered user ID which matches the user ID, and the registered signature information corresponding to the registered user ID based on the input user ID. Then, a check is made between the handwriting component data of the read registered signature information and those of the just input handwritten signature information, and a check result indicating a match or a mismatch is notified to the data input/display device 2.

In this case, a check is conventionally made according to a uniform comparative logic such that the degrees of similarity of the characteristic amounts of the handwriting components such as the above described handwriting shape, handwriting velocity, handwriting acceleration, and handwriting pressure when registration is made, and those of the handwriting components when authentication is requested are uniformly calculated and put into numeric values, and check and evaluation are made with totals of the numeric values.

Since a handwritten signature is biometrics information, the characteristic amounts of handwriting components appear in a variety of ways depending on an individual, and different characteristic amounts appear for each individual. With the uniform comparative logic such that evaluation is made with a total numeric value of the degrees of similarity of the characteristic amounts of the handwriting components as conventional, characteristics of each individual are difficult to appear, and optimum comparison and check cannot be made for each individual. Therefore, inconveniences such as rejection of authentication despite being an authentic person, acceptance of authentication despite being a different person, and the like may arise.

Additionally, as described above, a user who requests authentication must input a user ID as character information, and separately handwrite and input the signature registered in correspondence with the user ID. However, it is troublesome to input not only the signature that is originally expected to be sufficient for identifying an individual, but also the user ID.

Furthermore, since the user ID is originally data composed of characters or numeric values, which do not directly relate to a user himself, the user is apt to forget the user ID. Accordingly, the user erroneously inputs his user ID in many cases, which causes the troublesomeness such that the user must again input the user ID. There is also a problem from this viewpoint.

SUMMARY OF THE INVENTION

An object of the present invention is to provide a handwritten signature authentication program, method and apparatus performing secure authentication according to the characteristics of a handwritten signature of each individual, and reducing the troublesomeness of inputting an ID by a user, in view of the above described conventional background.

Configurations of a handwritten signature authentication program, method and apparatus according to the present invention, which implement this object, are described below.

Firstly, the handwritten signature authentication program according to the present invention, which is intended to authenticate an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, causes a computer to execute a process, the process comprising: storing fonts of predetermined types, and codes respectively corresponding to the fonts as a handwriting dictionary in a handwriting dictionary storing unit; making a comparison and a reference between the fonts stored in the handwriting dictionary storing unit and handwriting shape data of an input handwritten signature, and reading codes corresponding to a closest font from the handwriting dictionary storing unit; generating a user ID by making a predetermined number of digits of numeric values of the read codes successive by a number of the codes; making a correspondence between the generated user ID and data of the input handwritten signature, and storing the user ID and the data of the input handwritten signature as registered signature data, when a signature is registered; reading the registered signature data corresponding to the user ID generated by a user ID generating unit from a registered signature data storing unit when a signature is authenticated; and performing authentication based on the data of the input handwritten signature and the registered signature data.

The above described fonts are fonts of characters, numerals, symbols, and signs. Additionally, a user ID may be generated by adding a numeric value, which represents a number of codes, to the start of the user ID in which the predetermined number of digits of numeric values of the codes are made successive by the number of the codes in the user ID generation process. Or, for example, a predetermined number of digits of numeric values of the codes may be made successive in an order where the codes are read from the handwriting dictionary storing unit.

Furthermore, the component characteristic amount is configured by at least one of characteristic amounts of signature information, such as a handwriting shape, a handwriting velocity, a handwriting acceleration, and a handwriting pressure. Besides, an input of the handwritten signature is made with an input pen and an input board.

The handwritten signature authentication method according to the present invention, which authenticates an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, comprises: storing fonts of predetermined types, and codes respectively corresponding to the fonts as a handwriting dictionary in a handwriting dictionary storing unit; making a comparison and a reference between the fonts stored in the handwriting dictionary storing unit and handwriting shape data of an input handwritten signature, and reading codes corresponding to a closest font from the handwriting dictionary storing unit; generating a user ID by making a predetermined number of digits of numeric values of the read codes successive by a number of the codes; making a correspondence between the generated user ID and data of the input handwritten signature, and storing the user ID and the data of the input handwritten signature as registered signature data, when a signature is registered; reading the registered signature data corresponding to the user ID generated by a user ID generating unit from a registered signature data storing unit when a signature is authenticated; and performing authentication based on the data of the input handwritten signature and the registered signature data.

The handwritten signature authentication apparatus according to the present invention, which has an authenticating unit authenticating an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, comprises: a handwriting dictionary storing unit storing fonts of predetermined types, and codes respectively corresponding to the fonts as a handwriting dictionary; a code reading unit making a comparison and a reference between the fonts stored in said handwriting dictionary storing unit and handwriting shape data of an input handwritten signature, and reading codes corresponding to a closest font from said handwriting dictionary storing unit; a user ID generating unit generating a user ID by making a predetermined number of digits of numeric values of the read codes successive by a number of the codes; a registered signature data storing unit making a correspondence between the user ID generated by said user ID generating unit, and data of the input handwritten signature, and storing the user ID and the data of the input handwritten signature as registered signature data, when a signature is registered; and a registered signature data reading unit reading the registered signature data corresponding to the user ID generated by said user ID generating unit from said registered signature data storing unit, when a signature is authenticated, wherein the authenticating unit performs authentication based on the data of the input handwritten signature and the registered signature data read by said registered signature data reading unit.

As described above, according to the present invention, a unique user ID is automatically generated from a handwritten signature, so that authentication can be performed only with an input of handwritten signature information, which becomes a basis of the authentication, and there is no need to input a user ID by a user. This saves the troublesomeness of the user when a signature is handwritten and reduces the load on the user, which affords convenience.

Furthermore, it is possible to reduce the number of conventional human errors of a user ID input due to forgetting or misremembering of a user ID at the time of authentication, thereby improving the use efficiency of the authentication system.

BRIEF DESCRIPTION OF THE DRAWINGS

FIGS. 3A, 3B, and 3C show the fundamental structures of handwritten signature data used in a communication among a terminal, a relay path, and a host device in a handwritten signature authentication system according to the present invention;

DESCRIPTION OF THE PREFERRED EMBODIMENTS

Hereinafter, preferred embodiments according to the present invention are described with reference to the drawings.

Figure 1:
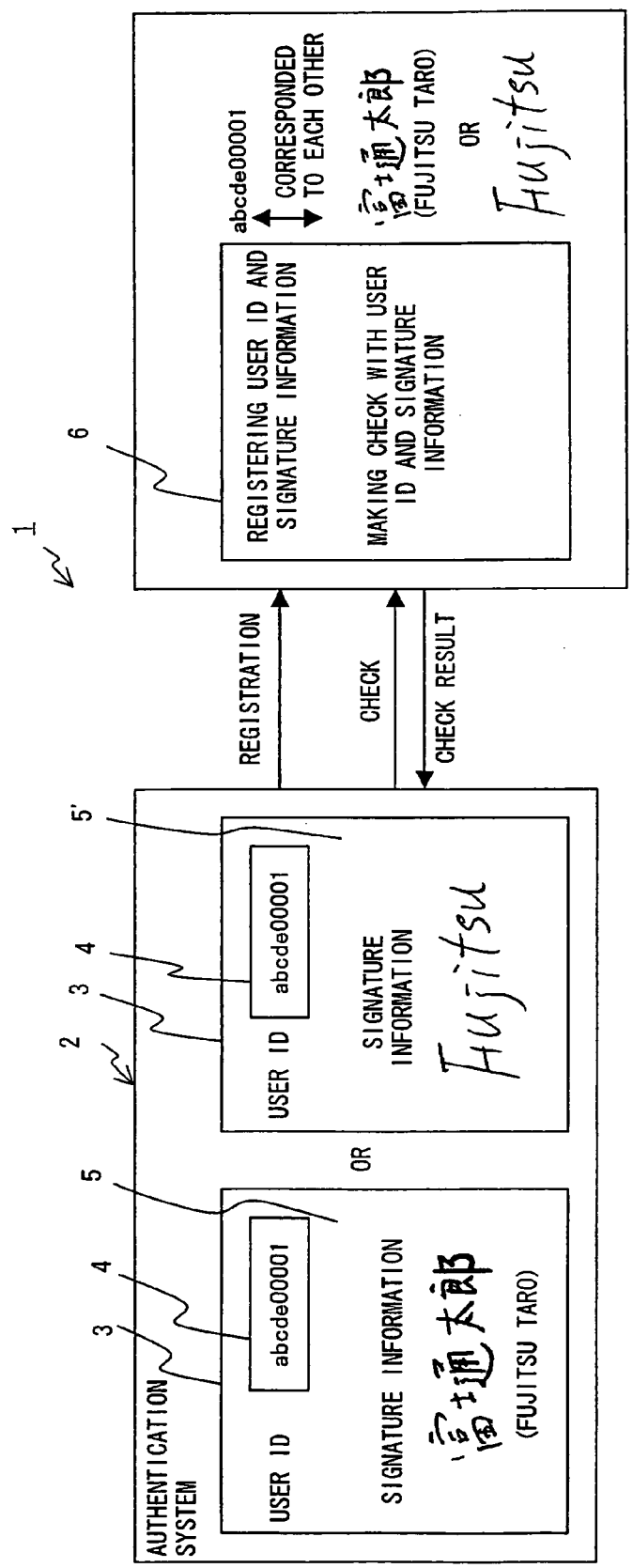
FIG. 1 explains a conventional authentication system using a handwritten signature.
Figure 2:
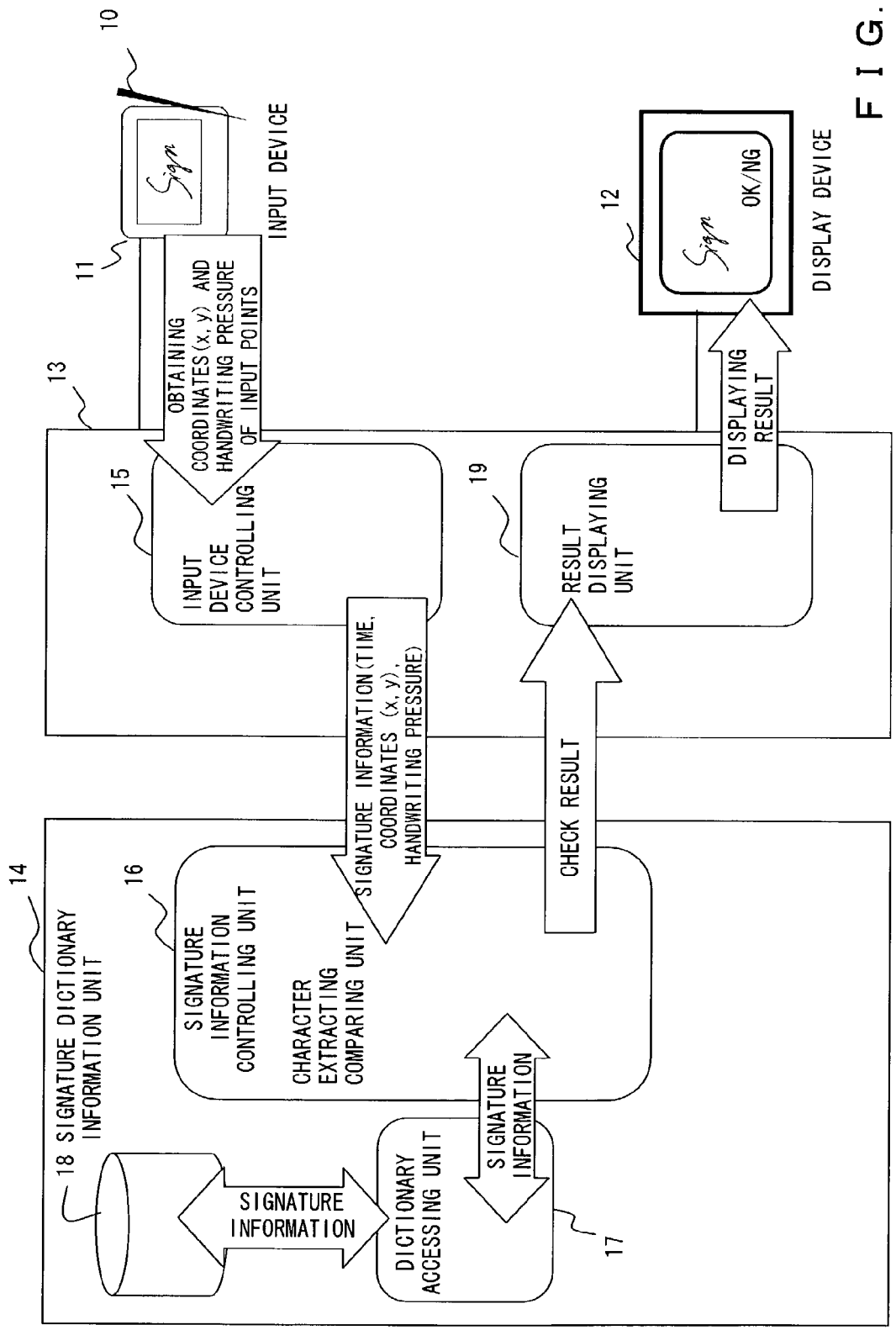
FIG. 2 schematically shows the fundamental configuration of hardware used in a preferred embodiment of a handwritten signature authentication method according to the present invention.

FIG. 2 schematically shows the fundamental configuration of hardware used in a preferred embodiment of a handwritten signature authentication method according to the present invention, which is described below. As shown in this figure, the hardware configuration, which is used in the handwritten signature authentication method according to the present invention, is implemented by an input device 13 to which an input unit 11 comprising an input tool 10, and a display device 12 are connected, and a host device 14 which is configured, for example, by a mainframe computer system, etc., and connected to the input device 13.

The host device 14 and the input device 13 may be directly connected with wires, or may be connected with a network such as the Internet, an intranet, etc. The input device 13 may be configured, for example, by a personal computer.

The input tool 10 and the input unit 11 may be, for example, a tablet configured by a stylus (10) and a handwriting input board (11), or the like. In this case, the display device 12 is a display device configured by, for example, a CRT (Cathode Ray Tube), an LCD (Liquid Crystal Display), etc., which is connected to a personal computer.

Furthermore, the input tool 10 and the input device 11 may be a personal portable information terminal named PDA (Personal Digital Assistant), or the like. In this case, configuration where a transparent handwritten input unit (10) is stacked on the display device 12 is adopted in many cases, and an input is made to the handwritten input unit (10) with a resinous pen (11), etc.

Connections between the input unit 11 and the input device 13, and between the display device 12 and the input device 13 are not directly made with wires in all cases. The connections may be made, for example, with an infrared ray communication, a bluetooth communication, or other close range wireless communication methods.

In all cases, input information of a handwritten signature that is handwritten and input from the input unit 11 with the input tool 10 are input to an input device controlling unit 15 of the input device 13. The input information of the handwritten signature input from the input unit 11 to the input device controlling unit 15 are coordinate data (x,y) of a point input with a stylus, etc., and its handwriting pressure data. Then, time data is added by the input device controlling unit 15 to the coordinate data (x,y) and the handwriting pressure data, which are input to a signature information controlling unit 16 of the host device 14.

The signature information controlling unit 16 calculates the handwriting velocity and the handwriting acceleration of the handwritten signature for each point based on the coordinate data (x,y) and the time data. At the same time, the signature information controlling unit 16 generates each piece of handwriting shape data by recognizing the point at which the value of the handwriting pressure data becomes zero as a boundary of the start or the end point of one stroke (the same as one stroke when proper handwriting is made).

Additionally, a comparison is made between every piece of the handwriting shape data and character information (font data) of every type prestored as a handwriting dictionary in a signature dictionary information unit 18, a character string corresponding to the most suitable character information is extracted, and character codes corresponding to this character string are extracted, so that a user ID based on the character codes, which will be described later, is automatically generated.

Notice that numerals and symbols are included in the above described characters or character string. However, such characters or a character string are referred to simply as characters or character string hereinafter.

Furthermore, handwriting component data of 4 types such as the handwriting shape, the handwriting velocity, the handwriting acceleration, and the handwriting pressure of the above described handwritten signature are corresponded to one another by the signature information controlling unit 16, and characteristic amounts based on a predetermined criterion are extracted from the handwriting component data.

If the above described handwritten signature is input at the time of registration, its characteristic amounts are corresponded to the automatically generated user ID by the signature information controlling unit 16, and registered to the signature dictionary information unit 18, which is configured by a predetermined storage device, via a dictionary accessing unit 17. As a result, the handwritten signature data for registration is registered to the host device 14.

Furthermore, if the same person inputs a signature by a plurality of times at the time of registration, the signature information controlling unit 16 extracts characteristic amounts of the signature data input by the plurality of times, makes checks and comparisons among the signature data input by the plurality of times, and notifies a result displaying unit 19 of the input device 13 of a check result. The result displaying unit 19 drives the display device 12 for display, and makes a predetermined display based on the result of the check. For example, a display such as "registration is complete", "again input a signature", etc. is made.

Also in this case, if registration is made as "registration is complete", the characteristic amounts obtained from the signature data and the user ID that is automatically generated from the handwriting data of the signature are corresponded to each other, and recorded to the signature dictionary information unit 18, so that the handwritten signature data for registration is registered to the host device 14.

In the meantime, if the above described handwritten signature is input at the time of a check made for authentication, the signature information controlling unit 16 automatically generates a user ID from the handwriting data of the handwritten signature, reads the handwritten signature data for registration, which is pre registered in correspondence with the automatically generated user ID, from the signature dictionary information unit 18 via the dictionary accessing unit 17, makes checks and comparisons between the read handwritten signature data for registration and the handwritten signature data for check, which is input from the input device controlling unit 15 and the characteristic amounts has been just extracted from, and notifies the result displaying unit 19 of the input device 13 of a check result indicating a match or a mismatch.

The result displaying unit 19 drives the display device 12 for display also in this case, and makes a predetermined display based on the check result. If the check result indicates a match (authentication is OK), a display such as "identified as the authentic person", etc. is made. If the check result indicates a mismatch (authentication is NG), a display such as "you are not the authentic person" is made.

FIGS. 3A to 3D show the fundamental structures of handwritten signature data (communication data) used in a communication made among a client (for example, the input unit 11 in the case of a PDA, or the input unit 11, the display device 12, and the input device 13 in the case of a personal computer system), a relay layer (a communications path linking the input device 13 and the host device 14), and an authentication engine (the signature information controlling unit 16 of the host device 14).

FIG. 3A shows the entire structure of communication data, which is composed of a header portion 21 and a data portion 22. FIG. 3B shows the structure of signature data which forms the data portion 22 of the communication data. As shown in FIG. 3B, the signature data is composed of a data header portion 23 (23-1, 23-2, . . . , 23-n), and a handwriting data portion 24 (24-1, 24-2, . . . , 24-n). The handwriting data portion 24 is data corresponding to a character string (a last name and a first name) of one signature.

FIG. 3c shows the structure of the handwriting data portion 24. The handwriting data portion 24 is composed of many pieces of point data 25 (25-1, 25-2, . . . , 25-m) indicated by "dot" shown in FIG. 3C. FIG. 3D shows the structure of the data of each point (dot) 25. As shown in FIG. 3D, the data of each point (dot) 25 is composed of data indicated by "t", "x", "y", and "p".

The above described "t" represents time, and is composed of 2-byte data. The "x" and "y" represent the absolute coordinates of horizontal and vertical axes of an input board of a tablet or an input unit of a PDA, and are respectively composed of 2-byte data. The "p" represents the handwriting pressure, and is similarly composed of 2-byte data. Namely, one piece of the point data 25 in the handwriting data portion 24 is composed of a total of 8-byte data.

The position of the point data 25 such that the value of the "p" within the 8-byte data is "0x00", namely, the handwriting pressure is "0" is determined as the boundary of the start or the end point of one stroke of handwriting.

A preferred embodiment of the handwritten signature authentication method according to the present invention, which has such a fundamental configuration of hardware and data processes, is described below.

Figures 4A, 4B:
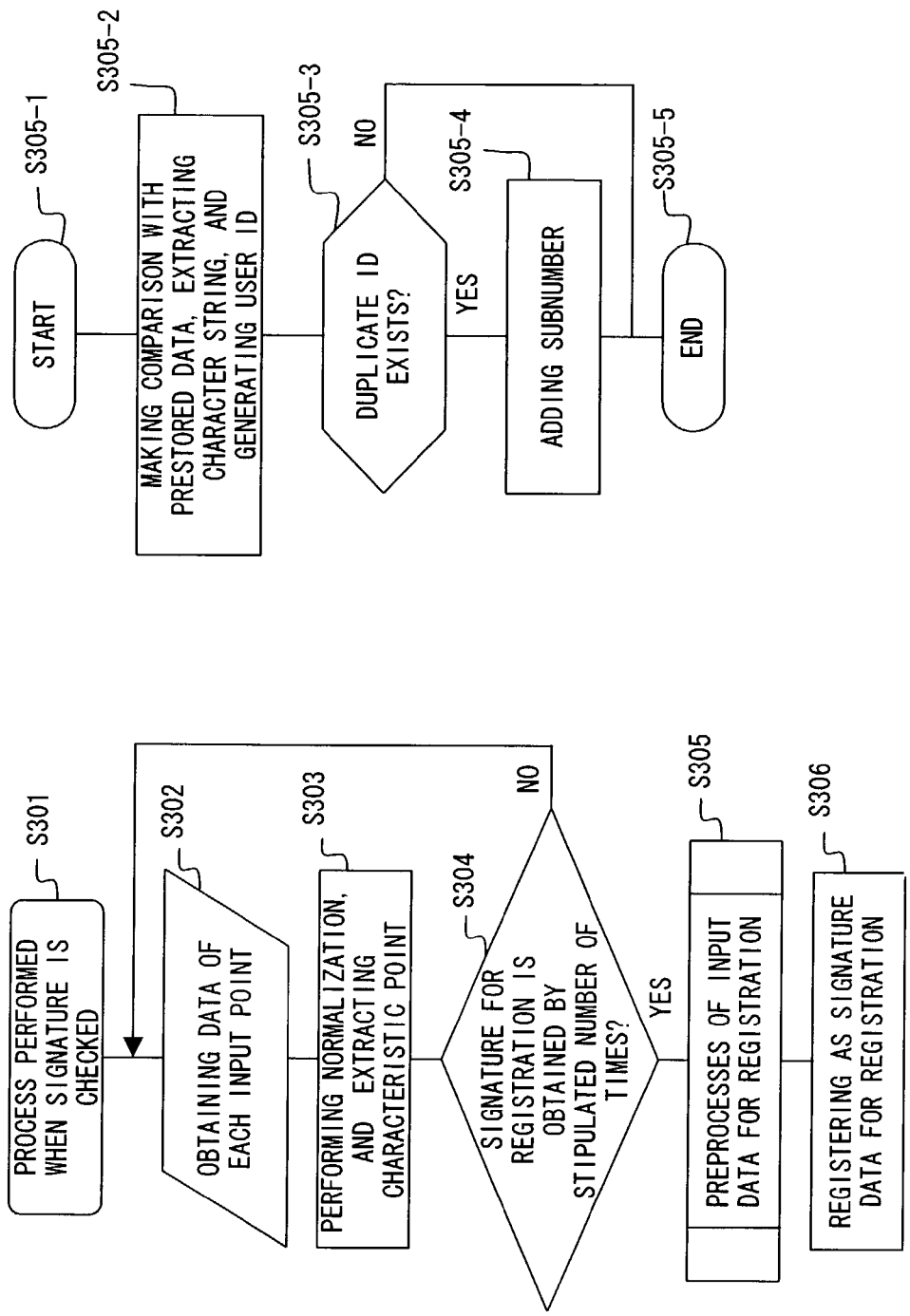
FIGS. 4A and 4B are flowcharts explaining the processes performed when a signature is registered in a handwritten signature authentication system according to a preferred embodiment.

FIG. 4A is a flowchart explaining the process performed when a signature is registered in a handwritten signature (hereinafter referred to simply as a signature) authentication system according to a preferred embodiment, and FIG. 4B is a flowchart explaining part of the process performed in step S305 in further detail.

Figure 5:
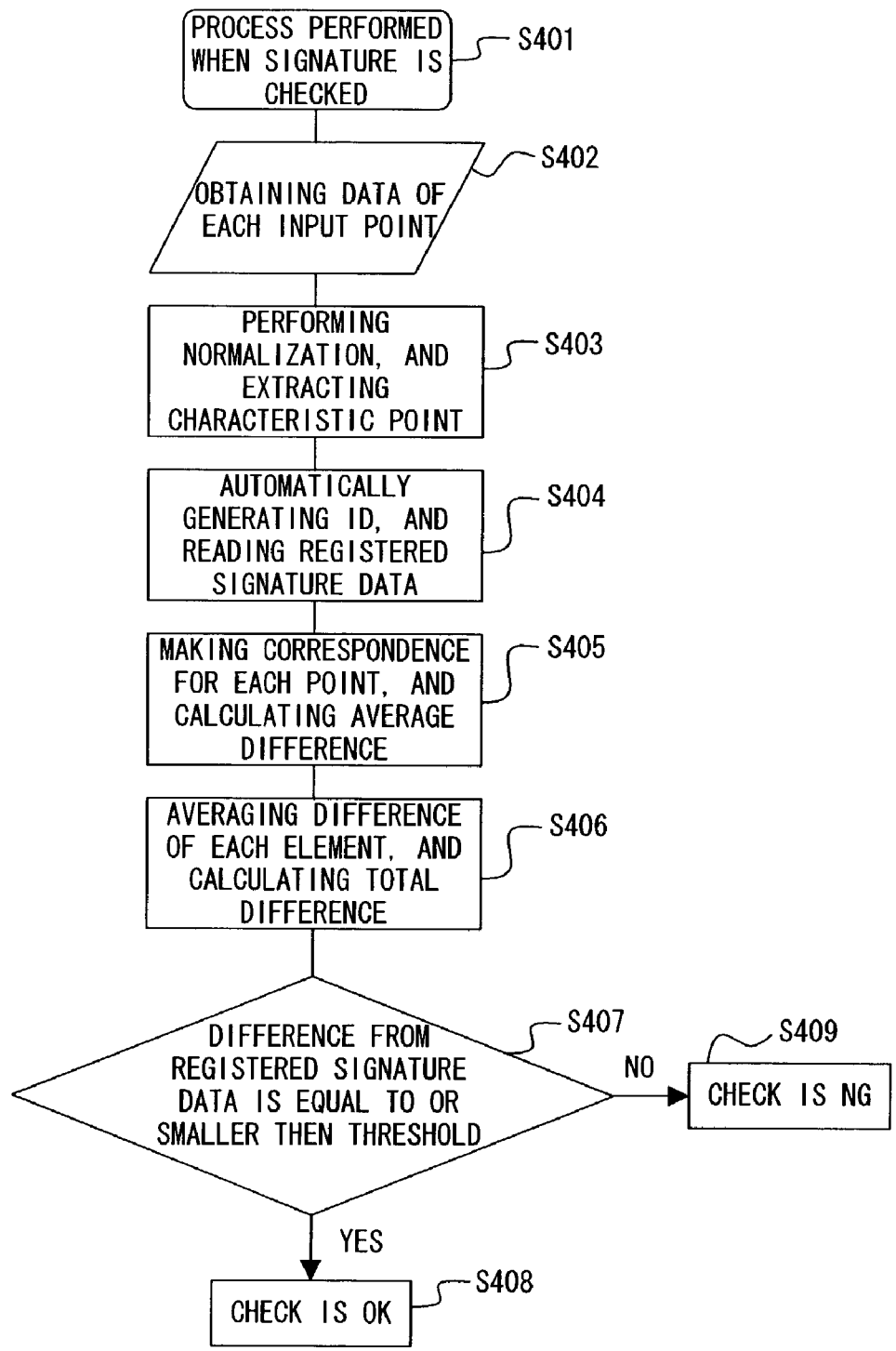
FIG. 5 is a flowchart explaining the process performed when a signature is checked for authentication in the handwritten signature authentication system according to the preferred embodiment.

FIG. 5 is a flowchart explaining the process performed when a signature is checked for authentication in the above described authentication system.

Figure 6:
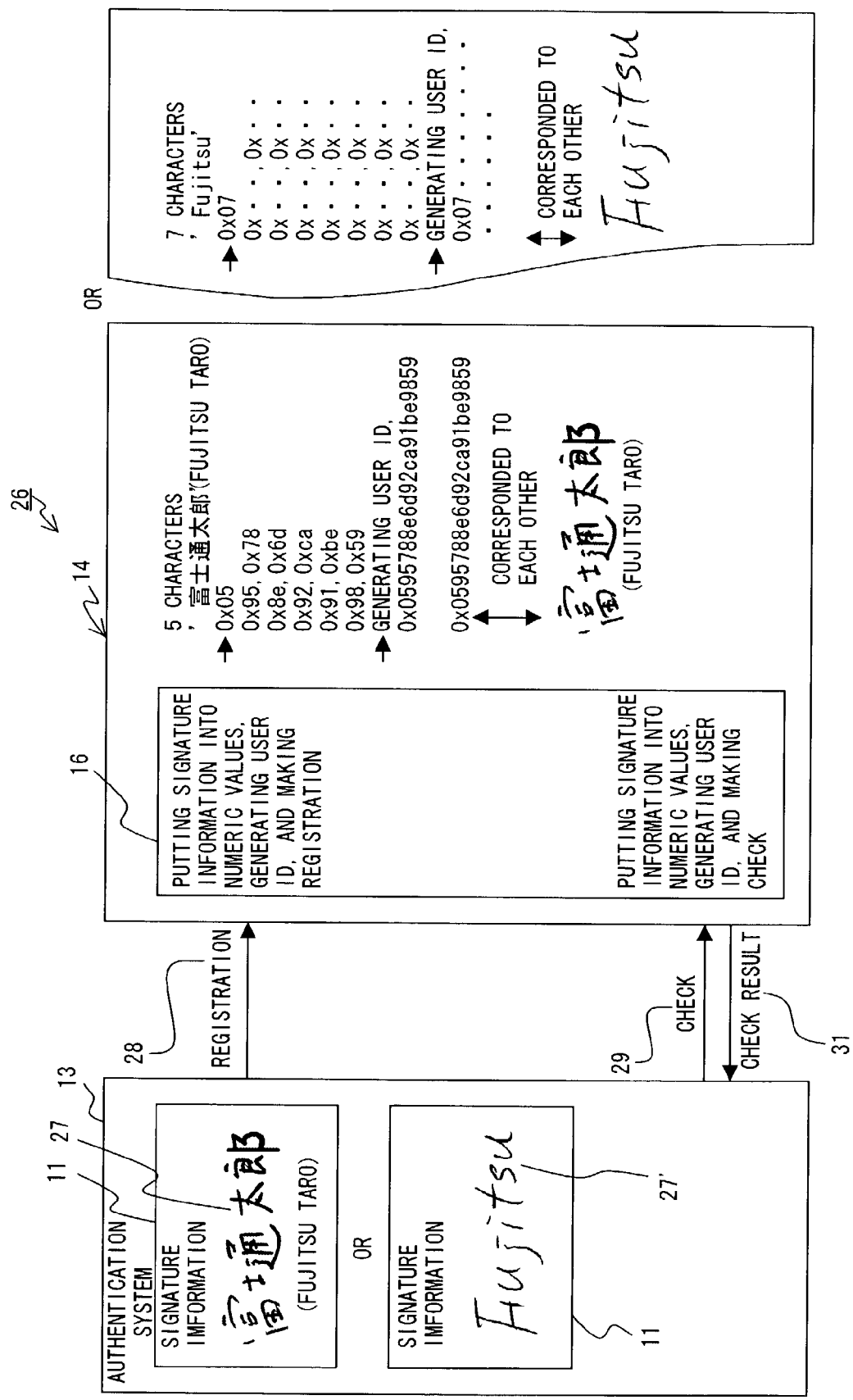
FIG. 6 schematically shows the outline of processes when registration and authentication are performed among respective modules of the handwritten signature authentication system according to the preferred embodiment.

FIG. 6 schematically shows the outline of the authentication method among the respective modules in the above described process.

The process performed when a signature is registered is first explained with reference to FIGS. 4 and 6, and the process performed when a signature is checked is explained next with reference to FIGS. 5 and 6.

Once the process performed when a signature is registered is started in FIG. 4A (step S301), a person who attempts to register his or her own signature inputs, for example, a kanji character signature 27 "富士通太郎" (Fujitsu Taro) or an English signature 27' "Fujitsu", which is the name of the person, by using the input unit 11 connected to the input device 13 in a signature authentication system 26 as shown in FIG. 6.

Then, data of each input point is obtained by the input unit 11 based on this input as shown in FIG. 4A (step S302). The data of each input point is point data shown in FIG. 3C. As shown in FIG. 6, the kanji character signature data 27 or the English signature data 27', which is obtained as the point data, is input as input signature data for registration 28 to the signature information controlling unit 16 of the host device 14 via the predetermined communications path explained with reference to FIG. 2.

The signature information controlling unit 16 performs a normalization process for aligning the position of an origin for data of each point of the input kanji character signature data 27 or English signature data 27', and extracts a characteristic point of each stroke (step S303). The characteristic point referred to here is different from the above described characteristic amount and a characteristic amount to be described later, and indicates a characteristic portion such as the start point, the end point, the turning point, etc. of handwriting.

Then, the signature information controlling unit 16 determines whether or not the above described signature data is obtained by a stipulated number of times (step S304). In this embodiment, a signature input is made by a plurality of times when the signature is registered, in order to obtain stable characteristic amounts of components (data of handwriting shape, handwriting velocity, handwriting acceleration, and handwriting pressure) of each stroke of input signature data. Accordingly, in this process, it is determined whether or not a signature input is made by a plurality of times as described above. In this embodiment, the number of times that a signature input is made at the time of registration is assumed to be 5.

If the signature input has not been made by 5 times, which is the stipulated number of times ("NO" in step S304), the next signature input is waited in step S302, and the processes in steps S302 to S304 are repeated.

When the signature input has been made by 5 times, which is the stipulated number of times ("YES" in step S304), preprocesses of input data for registration are performed based on the signatures input by 5 times (step S305).

The preprocesses of the input data for registration are a process for automatically generating a user ID, which is represented by step S305-2 of FIG. 4B, and a process for extracting a characteristic amount of each component from the signatures input by 5 times, and for making a correspondence between a weight obtained from the characteristic amount and each component data.

Then, data composed of the user ID, each component data, and weight data corresponded to each component data, which are generated with the preprocesses, is registered to the signature dictionary information unit 18 as signature data for registration (S306).

Here, a method setting the above described weight is first explained below. Generally, handwriting of a signature placed by a person has a characteristic (peculiarity). As elements (components) of handwriting which exhibits such peculiarity, there are 4 major elements such as a handwriting shape, a handwriting velocity, a handwriting acceleration, and a handwriting pressure as described above. Any one of these 4 elements always exhibits a stable peculiarity depending on a person. A weight is applied based on this characteristic amount and comparisons are made, so that checks can be made for a signature for authentication in a more secure way.

Firstly, a difference of each element among the data of the signatures input by 5 times is obtained. Then, a ratio of differences of the elements is obtained. As a result, the degrees of similarity of the input data that indicates which element difference is small (stable) is obtained. A weight is set based on the degrees of similarity. The degree of similarity, which is referred to here or will be described below, indicates an inverse number of a difference.

To obtain the above described weight, specifically, $_5C_2$ (10) combinations of the degrees of similarity "$S_s$, $S_v$, $S_a$, $S_p$", that is, "$(S_{s1}, S_{v1}, S_{a1}, S_{p1})$, $(S_{s2}, S_{v2}, S_{a2}, S_{p2})$, ..., $(S_{s10}, S_{v10}, S_{a10}, S_{p10})$" are first calculated for the components such as the handwriting shape, the handwriting velocity, the handwriting acceleration, and the handwriting pressure of the signature data input by 5 times. Then, their average "$(S_{se}, S_{ve}, S_{ae}, S_{pe})$" is obtained.

Prior to this calculation, the degrees of similarity of the respective components "$S_s$, $S_v$, $S_a$, $S_p$" are calculated as follows. Firstly, each element is assumed to be a set of n points, and elements of an input and a later input are respectively denoted as "$*_{dn}$" and "$*_{in}$".

Firstly, a difference of the handwriting shape data is defined to be the value of a Euclidean distance (distance in a two-dimensional Euclidean space) between an input ($x_{dn}$, $y_{dn}$) and a later input ($x_{in}$, $y_{in}$) after being normalized. Namely, the distances (differences) between the two inputs at the n points are respectively represented as follows.

$$D_{s1} = \sqrt{\{(x_{d1} - x_{i1}) \wedge 2 + (y_{d1} - y_{i1}) \wedge 2\}}$$

$$D_{s2} = \sqrt{\{(x_{d2} - x_{i2}) \wedge 2 + (y_{d2} - y_{i2}) \wedge 2\}}$$

..., $$D_{sn} = \sqrt{\{(x_{dn} - x_{in}) \wedge 2 + (y_{dn} - y_{in}) \wedge 2\}}$$

The difference of all of the points of the handwriting shape is an average of $D_{s1}$ to $D_{sn}$. Additionally, its inverse number is the above described degree of similarity "$S_s$".

For the difference of the handwriting velocity data, the velocity at each point is assumed to be "(a difference of the distance from a prior point)/(a difference of the time)". Namely, the velocities at the n points of the handwriting velocity data of the prior input are respectively represented as follows.

$$v_{d1} = \sqrt{\{(x_{d0} - x_{d1}) \wedge 2 + (y_{d0} - y_{d1}) \wedge 2\}}/(t_{d0} - t_{d1}),$$

$$v_{d2} = \sqrt{\{(x_{d1} - x_{d2}) \wedge 2 + (y_{d1} - y_{d2}) \wedge 2\}}/(t_{d1} - t_{d2}),$$

..., $$v_{dn} = \sqrt{\{(x_{dn-1} - x_{dn}) \wedge 2 + (y_{dn-1} - y_{dn}) \wedge 2\}}/(t_{dn-1} - t_{dn})$$

Also the velocities at the n points of the subsequent input "$V_{1n}$" are similar. According to these results, the differences between an input and a later input at the n points of the handwriting velocity data are respectively represented as follows.

$$D_{v1} = V_{d1} - V_{i1}, D_{v2} = V_{d2} - V_{i2}, \ldots, D_{vn} = V_{dn} - V_{in}$$

The difference at all of the points of the handwriting velocity is an average of $D_{v1}$ to $D_{vn}$. Additionally, its inverse number is the above described degree of similarity "$S_v$".

For the difference of the handwriting acceleration data, an acceleration at each point is defined to be a difference of a "velocity/time" from a prior point. Namely, accelerations at the n points of the handwriting acceleration data of the earlier input are respectively represented as follows.

$$a_{d1} = (v_{d0} - v_{d1})/(t_{d0} - t_{d1}),$$

$$a_{d2} = (v_{d1} - v_{d2})/(t_{d1} - t_{d2}),$$

..., $$a_{dn} = (v_{dn-1} - v_{d1})/(t_{dn-1} - t_{dn})$$

Also accelerations of the later input "$a_{in}$" are similar. According to these results, differences between the n points of the earlier input and the later input of the handwriting acceleration data are respectively represented as follows.

$$D_{a1} = a_{d1} - a_{i1}, D_{a2} = a_{d2} - a_{i2}, \ldots, D_{an} = a_{dn} - a_{in}$$

The difference of all of the points of the handwriting acceleration is an average of $D_{a1}$ to $D_{an}$. Its inverse number is the above described degree of similarity "$S_a$".

The value of the difference of the handwriting pressure data is defined to be a difference of a pressure value between an input and a later input at each point. Namely, differences between an input and a later input at the n points of the pressure data are respectively represented as follows.

$$D_{p1} = P_{d1} - P_{i1}, D_{p2} = P_{d2} - P_{i2}, \ldots, D_{pn} = P_{dn} - P_{in}$$

The difference at all of the points of the pressure data is an average of $D_{p1}$ to $D_{pn}$.

The above described $_5C_2$ (10) combinations can be calculated by using these degrees of similarity "$S_s$, $S_v$, $S_a$, $S_p$" can be calculated.

$$(S_{s1}, S_{v1}, S_{a1}, S_{p1}), (S_{s2}, S_{v2}, S_{a2}, S_{p2}), \ldots, (S_{s10}, S_{v10}, S_{a10}, S_{p10})$$

Additionally, their average is defined as follows.

$$(S_{se}, S_{ve}, S_{ae}, S_{pe})$$

Here, if the average degrees of similarity, which are obtained as described above, of the respective components of the signatures input by a signature registrant A by 5 times become as follows $$(S_{se}, S_{ve}, S_{ae}, S_{pe}) = (10, 20, 80, 10)$$

the degree of similarity of the handwriting acceleration among the components of the handwriting of the signature registrant A is recognized to be the highest, namely, the most stable among the 5 inputs.

Based on this result, a weight distribution among the components $S_s$, $S_v$, $S_a$, and $S_p$ is defined as follows.

(1, 2, 8, 1)

This weight may be arbitrary numeric values as long as the values have a relationship of 1:2:8:1, as a matter of course.

If a total degree of similarity SI of the signature registrant S1 is calculated by using the above described weight, it is calculated as follows.

$$SI = (1 \times S_s + 2 \times S_v + 8 \times S_a + 1 \times S_p)/(1 + 2 + 8 + 1)$$

$$= (10 + 40 + 640 + 10)/12$$

$$= 700/12$$

$$= 58.3$$

This relational expression is registered to the signature dictionary information unit 18 as registered signature data for authentication of the signature registrant A, as shown in FIG. 2. Here, the above described signature registrant A is assumed to be the person whose name is "富士通太郎" in kanji characters, or "Fujitsu" in English characters shown in FIG. 6.

Assume that the average degrees of similarity, which are obtained as described above, of the components of signatures input by another signature registrant B by 5 times are as follows.

$$(S_{se}, S_{ve}, S_{ae}, S_{pe})=(10, 10, 10, 80)$$

In this case, the degree of similarity of the handwriting pressure among the components of the handwriting of the signature registrant B is recognized to be the highest, namely, the most stable in all cases.

Based on this result, a weight distribution among the components $S_s$, $S_v$, $S_a$, and $S_p$ is determined to be $$(1, 1, 1, 8)$$

Then, a total degree of similarity S2 of the signature registrant B is calculated with this weight as follows.

$$\begin{aligned} S2 &= (1 \times S_s + 1 \times S_v + 1 \times S_a + 8 \times S_p)/(1+1+1+8) \\ &= (10 + 10 + 10 + 640)/11 \\ &= 607/11 \\ &= 60.9 \end{aligned}$$

This relational expression is registered to the signature dictionary information unit 18 as registered signature data for authentication of the signature registrant B.

Furthermore, in step S305 of FIG. 4A, the process for automatically generating a user ID, which is shown in FIG. 4B, is performed in addition to the above described process for corresponding a weight to the degrees of similarity. Once the process for automatically generating a user ID is started (step S305-1) in FIG. 4B, a comparison is made between data of each input point obtained from predetermined input signature data, and the data of each point of characters prestored in the signature dictionary information unit 18, and a character string composed of the most suitable characters is extracted in the next step S305 (305-2?).

This extracted character string is a character string that is suitable for the handwriting information of input signature data, and not always the same characters or character string as an input signature. However, if an input signature is a signature whose components exhibits a stable peculiarity of an authentic person, a character string that is obtained from the registered character fonts based on the handwriting information of this signature as described above is almost the same character string of the signature.

Then, predetermined character codes (for example, JIS code, Shift-JIS code, etc.) corresponding to the extracted characters are extracted, and a user ID based on the character codes is automatically generated. A method automatically generating a user ID is as follows.

Firstly, signature information is recognized as characters. As described above, the characters recognized here are not always the same characters as those of the input signature. For ease of explanation, however, the same character string "富士通太郎" as the input kanji character signature 27 is assumed to be recognized.

The character codes of this character string are as follows: "富" ("Fu") is "0x95, 0x78", "士" ("ji") is "0x83, 0x6d", "通" ("tsu") is "0x92, 0xca", "太" ("ta") is "0x91, 0xbe", and "郎" ("ro") is "0x98, 0x59".

The number of recognized characters (5 in this case), namely, 0x05 is added to the start of a user ID based on these character codes, numeric values 95, 78, 8e, 6d, 92, ca, 91, be, 98, and 59 are sequentially obtained from the respective codes, and the user ID is generated by making these values successive. That is, "0x0595788e6d92ca91be9859" is generated as the user ID here.

Subsequent to the above described operation, it is determined whether or not a user ID which matches the generated user ID is already stored in the signature dictionary information unit 18 in step S305-3. If a duplicate user ID exists, a subnumber is added to the generated user ID, and the operation (step S305-5), namely, the process of step S305 of FIG. 4A is terminated. The flow then proceeds to step S306. Then, the user ID is corresponded to the input kanji character signature 27 "富士通太郎", and registered to the signature dictionary information unit 18 as signature data for registration.

The character string extracted form the signature dictionary information unit 18, which is the basis of generating the user ID to which the subnumber is added, is the same. However, input signature data registered in correspondence with a user ID whose subnumber is different varies depending on each individual. Accordingly, even if a handwriting shape, which is the basis of being recognized as the same character string, is similar, the other handwriting components vary depending on each individual. This will be further explained in the subsequent authentication process.

When the person whose name is "富士通太郎" in kanji characters or "Fujitsu" in English characters attempts to obtain authentication with a signature, the process performed when a signature is checked, which is shown in FIG. 5, is started (step S401). With this signature check for authentication, a check threshold common to all signature registrants is preset.

Next, a signature is input at least twice. Namely, the signature registrant A inputs the kanji character signature 27 "富士通太郎" or the English signature 27' "Fujitsu" by m (m=2, 3, 4, . . . ) times with the use of the input unit 11 connected to the input device 13 in order to obtain authentication, namely, to make a check against the above described registered signature. Data of each point of the input kanji character signature 27 or English signature 27' is obtained as input signature data for authentication 29 by the signature information controlling unit 16 of the host device 14 via the predetermined communications path (step S402).

The signature information controlling unit 16 performs a normalization process for aligning the position of an origin for data of each point of the input kanji character signature 27 or English signature 27' also in this case, and extracts a characteristic point of each stroke (step S403).

Then, the above described user ID is automatically generated by reading a character string of the closest font from the signature dictionary information unit 18 based on the handwriting shape obtained from the input point data, and registered signature data corresponding to the automatically generated user ID is read. If an identical user ID to which a subnumber is added exists, all pieces of the corresponding registered signature data are read (step S404).

Then, correspondence is made for each point of the input signature data, and an average difference is calculated (step S405). With this process, an average of differences (the degrees of similarity) of n points of each of the components is calculated from $_mC_2$ (m=2, 3, 4, 5, ...) combinations of the degrees of similarity with a method similar to the above described method used when the weight is applied at the time of signature registration.

Here, the usage of terms used in this preferred embodiment is explained. In the explanation of this embodiment, the degree of similarity is an inverse number of a difference, and the degree of similarity is referred to also as a difference.

Then, the average of the differences of the respective elements calculated as described above is further averaged to calculate a total difference (step S406). This process is a process for applying a weight, which is registered along with signature data, to the calculated degrees of similarity, and for calculating a weighted average by calculating an average value of the degrees of similarity to which the weight is applied.

As a result of this process, the total degree of similarity of the input signature data for authentication is calculated. Here, assuming that the signature registrant A inputs a signature for authentication in handwriting similar to that at the time of signature registration, the degree of similarity of the input signature data for authentication has almost no difference from the degree of similarity of the input signature data for registration at the time of signature registration. Therefore, the total degree of similarity $S1_{in}$, based on the weighted average that is calculated by applying the weight, which is registered along with the registered signature data of the authentic person, to the degree of similarity of the input signature data for authentication is calculated as a value close to the registered total degree of similarity S1 "58.3", which is calculated from the above described combinations of the signature data input by 5 times.

A comparison is made between the total degree of similarity $S1_{in}$ of the input signature data for authentication, and the total degree of similarity of the input signature data for registration, and their difference is calculated. Then, it is determined whether or not the calculated difference is equal to or smaller than a preset threshold (step S407).

If the difference is equal to or smaller than the threshold ("YES" in step S407), a signal indicating that the check is OK is output from the signature information controlling unit 16 of the host device 14 to the input device 13 (step S408). As a result, annuciation such as "you are identified as the authentic person", etc. is displayed by the result displaying unit 19 of the input device 13. This is a natural result, because of the authentication of the person who registers the signature.

Assume that the signature registrant B attempts to obtain authentication by imitating the handwriting of the signature registrant A, and by disguising himself as the signature registrant A with a falsified signature. In this case, the above described degrees of similarity $(S_{se}, S_{ve}, S_{ae}, S_{pe})$=(10, 10, 10, 80) of the falsified signature, which exhibits the peculiarity of the signature registrant B himself, are naturally calculated in the process of step S405.

The weight registered for the signature registrant A is distributed among the degrees of similarity, and a total degree of similarity $S1'_{in}$ is calculated based on the weighted average of the input signature data for authentication.

Namely, the weight of the signature registrant A (1, 2, 8, 1)

is distributed among the degrees of similarity of the components of the signature registrant B $(S_{se}, S_{ve}, S_{ae}, S_{pe})$=(10, 10, 10, 80)

so that the total degree of similarity $S1'_{in}$ of the signature registrant B as a result of calculating the weighted average becomes as follows.

$$S1'_{in} = (10 + 20 + 80 + 80)/12$$
$$= 190/12$$
$$= 15.8$$

The value of the total degree of similarity $S1'_{in}$=15.8 of the signature registrant B is significantly different from the total degree of similarity S1=58.3 of the signature registrant A. It is determined that this difference exceeds the predetermined threshold in the process of step S407 ("NO" in step S407), and a signal indicating that the check is NG is output from the signature information controlling unit 16 of the host device 14 to the input device 13 (step S409). As a result, annuciation such as "you are not the authentic person", etc. is displayed by the result displaying unit 19 of the input device 13.

This is similar also in the case where the signature registrant A attempts to obtain authentication as the signature registrant B with a falsified signature of the signature registrant B. That is, the degrees of similarity of the components $(S_{se}, S_{ve}, S_{ae}, S_{pe})$ of the signature registrant B are (10, 10, 10, 80) as described above, the distributed weight is (1, 1, 1, 8), and the total degree of similarity is "60.9".

In the meantime, if the signature registrant A places a falsified signature by imitating the signature of the signature registrant B, the degrees of similarity of the components of the falsified signature are calculated as (10, 20, 80, 10) exhibited from the peculiarity of the signature registrant A, almost as an inevitable consequence. The registered weight of the signature registrant B (1, 1, 1, 8)

is distributed among the degrees of similarity (10, 20, 80, 10)

so that a weighted average is calculated. As a result, the total degree of similarity $S2'_{in}$ of the input signature data for authentication in the handwriting falsified by the signature registrant A results in $$S2'in = (10 + 20 + 80 + 80)/11$$
$$= 190/11$$
$$= 17.3$$

This is significantly different from the total degree of similarity S2=60.9 registered for the signature registrant B. Also in this case, it is determined that this difference exceeds the predetermined threshold in the process of step S406, and a signal indicating that the check is NG is output from the signature information controlling unit 16 of the host device 14 to the input device 13. Then, annuciation such as "you are not the authentic person", etc. is displayed by the result displaying unit 19 of the input device 13.

Here, assume that the above described calculation of the total degrees of similarity is not the weighted averages but simple averages. In this case, the simple average $S_{t1}$ of the input made by the signature registrant A himself, which is not weighted, becomes as follows.

$$S_{t1}=(10+20+80+10)/4=120/4=30$$

Additionally, a simple average $S_{t2}$ of the input made by the signature registrant B himself, which is not weighted, becomes as follows.

$$S_{t2}=(10+10+10+80)/4=110/4=27.5$$

As is known from these values, there is no significant difference between the total degree of similarity of the signature registrant A and that of the signature registrant B, when the simple averages are used. Besides, the above described degrees of similarity exhibit a peculiarity as the original peculiarity of a person who falsifies a signature, even if the signature is falsified. Similar values are always calculated regardless of whether a signature is either authentic or unauthentic.

Accordingly, with the total degrees of similarity using the simple averages, the signature registrants A and B can possibly be misidentified as authentic persons each other. However, if weighted averages are used, a difference of each of the components becomes distinct, and a large difference arises in the total degree of similarity, so that misidentification cannot be made with ease, and a determination of whether a signature is either authentic or unauthentic can be securely made.

Next, with the other of the two authentication methods, a signature input for authentication is made only once. Additionally, in this case, registered signature data input by 5 times are respectively assumed to be preceding input data, and the signature data input once for authentication is assumed to be input data succeeding the signature data input by 5 times. The difference calculation, the combination settings, the average value calculation, and the calculation of the total degree of similarity, which are explained with reference to FIG. 4, are performed.

If the signature data for authentication is input by an authentic person, it is evident that the difference between the total degree of similarity of the input signature data for authentication and that of the registered signature data for registration becomes equal to or smaller than a threshold.

In the meantime, if the signature data for authentication is input by a different person with a falsified signature, the degree of similarity of the handwriting shape can possibly become high, because this is an imitated signature. However, since the handwriting velocity, the handwriting acceleration, and the handwriting pressure, which are invisible to the eyes, are components that can never be imitated by the different person, a difference becomes large between the signature data input by the different person with the falsified signature and the signature data for registration input by the authentic person. Namely, it is naturally expected that the degree of similarity becomes low. Accordingly, it can be easily expected that also the value of the total degree of similarity, which is resultant from the calculation made by distributing the weight registered for an authentic person among average values of such low degrees of similarity, becomes small, and the difference between the total degree of similarity of the falsified signature and the total degree of similarity registered for the authentic person exceeds the threshold as a result of the comparison between them. That is, the authentication results never in "OK" but in "NG".

With the authentication using an input made once, a handwriting shape component having a possibility that the degree of similarity becomes high may be excluded, only the three components such as a handwriting velocity, a handwriting acceleration, and a handwriting pressure may be adopted, and their total degree of similarity may be compared. Such an adoption is considered to further improve a ratio of protection against a signature falsified by a different person.

Additionally, if subnumbers are included in user IDs within the signature dictionary information unit 18, which match a user ID automatically generated from signature data for check, which is input to obtain authentication, the above described determination operation in step S407 is performed for all pieces of registered signature data corresponding to the user IDs having the subnumbers. The determination in step S407 results in "YES" when the check is made against the registered signature data of an authentic person.

Or, if the determination in step S407 results in "NO" when the check is made against all pieces of registered signature data corresponding to all of user IDs within the signature dictionary information unit 18, which match the user ID automatically generated from the input signature data for check, this indicates that there is no signature data having characteristic amounts within a threshold, which are close to the characteristic amounts of the respective components of the signature data input by a person who attempts to obtain authentication, and the signature of the person who attempts to obtain authentication has not been registered. Or, there is a possibility that the person who attempts to obtain authentication falsifies a signature with some intent.

Note that the above described process for automatically generating a user ID can be performed also for the English signature 27' in a similar manner. Namely, in this case, "0x07", which indicates that the number of characters of the input signature "Fujitsu" is 7, is added to the start of a user ID, and low-order 2 digits of the codes of the 7 characters are sequentially added to the initial code, so that the user ID is generated, as shown on the right side of FIG. 6. This generated user ID is registered in correspondence with the English input signature data "Fujitsu".

Also in this case, characters that are recognized from the handwriting of the English signature 27' are not always the 7 characters "Fujitsu" as described above.

Furthermore, the number of digits that are extracted from the codes and used for the user ID is not limited to 2. A suitable number of digits may be set and extracted according to the circumstances, as a matter of course.

As described above, according to the present invention, a signature is only handwritten and input when the signature is checked, so that a user ID is automatically generated from the handwritten signature data, which eliminates the need for inputting a user ID by a user. As a result, the troublesomeness of the user when a signature is handwritten can be saved, and the load on the user can be reduced, thereby affording convenience.

Additionally, a user ID that is registered in correspondence with an input registered handwritten signature is automatically generated based on the codes of a character string, which do not directly relate to the characters of a user signature, such as characters, numeric values, symbols, signs, etc. for which standard character codes are set. Therefore, the format of the user ID is externally hidden, so that the security is improved. Namely, this authentication system becomes the first barrier to a third party who attempts to make an unauthorized entry by inputting a random user ID.

Furthermore, this authentication system eliminates the possibility of erroneously performing authentication by suitably changing fonts of characters, numerals, symbols, signs, etc., which are registered to the signature dictionary information unit 18 in order to automatically generate a user ID, so as to prevent a user ID to which a subnumber is added from arising or to decrease the number of such user IDs, and by changing the structure of a registered user ID depending on need, if a large number of user IDS to which subnumbers are added arise.

In this case, the larger the number of dots of a used font, namely, the higher the resolution of a font, the more unique a correspondence between the handwriting shape of an input signature and dictionary data becomes. This has the effect of improving authentication accuracy.

What is claimed is:

1. A computer readable medium storing a handwritten signature authentication program, which when executed controls a computer to perform a process to authenticate an input handwritten signature by making a check between a predetermined component characteristic amount obtained by analyzing a characteristic of each component of data of the input handwritten signature, and a predetermined component characteristic amount obtained by analyzing a characteristic of each component of preregistered signature data, said process comprising:

storing fonts of predetermined types and codes respectively corresponding to the fonts, as a handwriting dictionary in a handwriting dictionary storing unit;

making a comparison and a reference between the fonts stored in the handwriting dictionary storing unit and handwriting shape data of an input handwritten signature, and reading codes corresponding to a closest font from the handwriting dictionary storing unit;

generating a user ID by adding a numeric value, which represents a number of codes, to a start of the user ID in which a predetermined number of digits of numeric values of the codes are made successive by a number of the codes;

making correspondence between the user ID and data of the input handwritten signature, and storing the user ID and the data of the input handwritten signature as registered signature data, when a signature is registered;

reading previously stored registered signature data corresponding to user IDs generated by a user ID generating module from a registered signature data storing module when a signature is authenticated; and performing authentication based on the data of the input handwritten signature and the registered signature data.

2. A computer readable medium storing a handwritten signature authentication program which when executed controls a computer to perform a process to authenticate an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, said process comprising:

storing fonts of predetermined types and codes respectively corresponding to the fonts, as a handwriting dictionary in a handwriting dictionary storing unit;

making a comparison and a reference between the fonts stored in the handwriting dictionary storing unit and handwriting shape data of an input handwritten signature, and reading codes corresponding to a closest font from the handwriting dictionary storing unit;

generating a user ID by making a predetermined number of digits of numeric values of the codes are made successive in an order where the codes are read from the handwriting dictionary storing unit;

making correspondence between the user ID and data of the input handwritten signature, and storing the user ID and the data of the input handwritten signature as registered signature data, when a signature is registered;

reading previously stored registered signature data corresponding to user IDs generated by a user ID generating module from a registered signature data storing module when a signature is authenticated; and performing authentication based on the data of the input handwritten signature and the registered signature data.

3. A handwritten signature authentication method authenticating an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, comprising:

storing fonts of predetermined types and codes respectively corresponding to the fonts, as a handwriting dictionary in a handwriting dictionary storing unit;

making a comparison and a reference between the fonts stored in the handwriting dictionary storing unit and handwriting shape data of an input handwritten signature, and reading codes corresponding to a closest font from the handwriting dictionary storing unit;

generating a user ID by adding a numeric value, which represents a number of codes, to a start of the user ID in which a predetermined number of digits of numeric values of the codes are made successive by a number of the codes;

making correspondence between the user ID and data of the input handwritten signature, and storing the user ID and the data of the input handwritten signature as registered signature data, when a signature is registered;

reading previously stored registered signature data corresponding to user IDs generated by a user ID generating module from a registered signature data storing module when a signature is authenticated; and performing authentication based on the data of the input handwritten signature and the registered signature data.

4. A handwritten signature authentication method authenticating an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, comprising:

storing fonts of predetermined types and codes respectively corresponding to the fonts, as a handwriting dictionary in a handwriting dictionary storing unit;

making a comparison and a reference between the fonts stored in the handwriting dictionary storing unit and handwriting shape data of an input handwritten signature, and reading codes corresponding to a closest font from the handwriting dictionary storing unit;

generating a user ID by making a predetermined number of digits of numeric values of the codes are made successive in an order where the codes are read from the handwriting dictionary storing unit;

making correspondence between the user ID and data of the input handwritten signature, and storing the user ID and the data of the input handwritten signature as registered signature data, when a signature is registered;

reading previously stored registered signature data corresponding to user IDs generated by a user ID generating module from a registered signature data storing module when a signature is authenticated; and performing authentication based on the data of the input handwritten signature and the registered signature data.

5. A handwritten signature authentication apparatus having an authenticating unit authenticating an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, comprising:

a handwriting dictionary storing unit storing fonts of predetermined types, and codes respectively corresponding to the fonts as a handwriting dictionary;

a code reading unit making a comparison and a reference between the fonts stored in said handwriting dictionary storing unit and handwriting shape data of an input handwritten signature, and reading codes corresponding to a closest font from said handwriting dictionary storing unit;

a user ID generating unit generating a user ID by adding a numeric value, which represents a number of codes, to a start of the user ID in which a predetermined number of digits of numeric values of the codes are made successive by the number of the codes;

a registered signature data storing unit making a correspondence between the user ID generated by said user ID generating unit, and data of the input handwritten signature, and storing the user ID and the data of the input handwritten signature as registered signature data, when a signature is registered; and a registered signature data reading unit reading the registered signature data corresponding to the user ID generated by said user ID generating unit from said registered signature data storing unit, when a signature is authenticated, the authenticating unit performing authentication based on the data of the input handwritten signature and the registered signature data read by said registered signature data reading unit.

6. A handwritten signature authentication apparatus having an authenticating unit authenticating an input handwritten signature by making a check between a predetermined component characteristic amount obtained by analyzing a characteristic of each component of data of the input handwritten signature, and a predetermined component characteristic amount obtained by analyzing a characteristic of each component of pre registered signature data, comprising:

a handwriting dictionary storing unit storing fonts of predetermined types, and codes respectively corresponding to the fonts as a handwriting dictionary;

a code reading unit making a comparison and a reference between the fonts stored in said handwriting dictionary storing unit and handwriting shape data of an input handwritten signature, and reading codes corresponding to a closest font from said handwriting dictionary storing unit;

a user ID generating unit generating a predetermined number of digits of numeric values of the codes successive in an order where the codes are read from said handwriting dictionary storing unit;

a registered signature data storing unit making a correspondence between the user ID generated by said user ID generating unit, and data of the input handwritten signature, and storing the user ID and the data of the input handwritten signature as registered signature data, when a signature is registered; and a registered signature data reading unit reading the registered signature data corresponding to the user ID generated by said user ID generating unit from said registered signature data storing unit, when a signature is authenticated, the authenticating unit performing authentication based on the data of the input handwritten signature and the registered signature data read by said registered signature data reading unit.

* * * * *

UNITED STATES PATENT AND TRADEMARK OFFICE
CERTIFICATE OF CORRECTION

PATENT NO.        : 7,116,804 B2
APPLICATION NO. : 10/282141
DATED             : October 3, 2006
INVENTOR(S)       : Tadashi Murase et al.

It is certified that error appears in the above-identified patent and that said Letters Patent is hereby corrected as shown below:

Column 17, Line 56, after "program" insert --,--.

Column 17, Line 63, change "pre registered" to --preregistered--.

Column 18, Line 27, change "pre registered" to --preregistered--.

Column 18, Line 60, change "pre registered" to --preregistered--.

Column 19, Line 25, change "pre registered" to --preregistered--.

Column 20, Line 16, change "pre registered" to --preregistered--.

Signed and Sealed this

Sixth Day of March, 2007

JON W. DUDAS
*Director of the United States Patent and Trademark Office*